(12) United States Patent
Haddadin

(10) Patent No.: US 11,623,355 B2
(45) Date of Patent: Apr. 11, 2023

(54) METHOD FOR PRODUCING A ROBOT AND DEVICE FOR CARRYING OUT SAID METHOD

(71) Applicant: KASTANIENBAUM GMBH, Munich (DE)

(72) Inventor: Sami Haddadin, Hannover (DE)

(*) Notice: Subject to any disclaimer, the term of this patent is extended or adjusted under 35 U.S.C. 154(b) by 1049 days.

(21) Appl. No.: 16/095,336

(22) PCT Filed: Apr. 20, 2017

(86) PCT No.: PCT/EP2017/059449
§ 371 (c)(1),
(2) Date: Jul. 1, 2019

(87) PCT Pub. No.: WO2017/182595
PCT Pub. Date: Oct. 26, 2017

(65) Prior Publication Data
US 2019/0315002 A1 Oct. 17, 2019
US 2020/0306999 A9 Oct. 1, 2020

(30) Foreign Application Priority Data

Apr. 20, 2016 (DE) ......................... 102016004788.7

(51) Int. Cl.
*B25J 18/04* (2006.01)
*B25J 19/00* (2006.01)
(Continued)

(52) U.S. Cl.
CPC ........... *B25J 19/007* (2013.01); *B25J 9/1669* (2013.01); *B25J 9/163* (2013.01); *B25J 9/1664* (2013.01);
(Continued)

(58) Field of Classification Search
CPC ........ B25J 19/007; B25J 9/1669; B25J 18/04; B25J 9/0009; F16H 57/02
See application file for complete search history.

(56) References Cited

U.S. PATENT DOCUMENTS 4,025,838 A 5/1977 Watanabe
4,398,110 A 8/1983 Flinchbaugh et al.
(Continued)

FOREIGN PATENT DOCUMENTS

AT 509927 A2 12/2011
CA 2940490 A1 9/2015
(Continued)

OTHER PUBLICATIONS

Paper titled "A Two-armed Intelligent Robot Assembles Mini Robots Automatically" by Shinsuke Sakakibara (Year: 1996).*
(Continued)

*Primary Examiner* — Randell J Krug
(74) *Attorney, Agent, or Firm* — Dilworth IP, LLC

(57) ABSTRACT

The invention relates to a method and to a device for producing a robot with a robotic arm. Said method can be carried out using an assembly robot wherein first housing segments are arranged in an intended sequence for the robotic arm, drive units are inserted into the first housing segments and the respective complimentary second housing segments are placed on the first housing segments comprising the drive units.

13 Claims, 17 Drawing Sheets

(51) Int. Cl.
  *B25J 9/16* (2006.01)
  *B25J 15/04* (2006.01)
  *B25J 17/02* (2006.01)
(52) U.S. Cl.
  CPC ........ *B25J 15/0475* (2013.01); *B25J 17/0258* (2013.01)

(56) References Cited

U.S. PATENT DOCUMENTS

| | | | |
|---|---|---|---|
| 4,591,198 | A | 5/1986 | Monforte et al. |
| 4,659,971 | A | 4/1987 | Suzuki et al. |
| 4,678,952 | A | 7/1987 | Peterson et al. |
| 4,804,304 | A | 2/1989 | Tellden et al. |
| 5,360,249 | A | 11/1994 | Monforte et al. |
| 6,422,441 | B1 | 7/2002 | Settelmayer et al. |
| 6,463,360 | B1 | 10/2002 | Terada et al. |
| 8,226,140 | B1 | 7/2012 | Dietrich et al. |
| 8,423,189 | B2 | 4/2013 | Nakanishi et al. |
| 2008/0016979 | A1 | 1/2008 | Yasumura et al. |
| 2009/0314120 | A1 | 12/2009 | Larsson et al. |
| 2010/0198394 | A1 | 8/2010 | Trygg |
| 2010/0314895 | A1 | 12/2010 | Rizk et al. |
| 2011/0190932 | A1 | 8/2011 | Tsusaka et al. |
| 2013/0151010 | A1 | 6/2013 | Kubota et al. |
| 2013/0255426 | A1 | 10/2013 | Kassow et al. |
| 2013/0273818 | A1* | 10/2013 | Guan .................. B25J 11/0065 451/270 |
| 2014/0047940 | A1* | 2/2014 | Yamamoto ............. B25J 17/00 74/490.05 |
| 2015/0053040 | A1 | 2/2015 | Ueda et al. |
| 2018/0207795 | A1 | 7/2018 | Haddadin et al. |
| 2018/0345505 | A1 | 12/2018 | Haddadin |
| 2018/0354141 | A1 | 12/2018 | Haddadin |
| 2018/0361594 | A1 | 12/2018 | Haddadin |
| 2019/0054634 | A1 | 2/2019 | Haddadin |
| 2019/0099879 | A1 | 4/2019 | Haddadin |
| 2019/0126465 | A1 | 5/2019 | Haddadin |
| 2019/0126468 | A1 | 5/2019 | Haddadin |
| 2019/0134811 | A1 | 5/2019 | Haddadin |
| 2019/0168383 | A1 | 6/2019 | Haddadin |

FOREIGN PATENT DOCUMENTS

| | | |
|---|---|---|
| CN | 201437046 U | 4/2010 |
| CN | 102302858 A | 1/2012 |
| CN | 102410342 A | 4/2012 |
| CN | 104802156 A | 7/2015 |
| DE | 296 09 018 U1 | 8/1996 |
| DE | 197 31 656 C1 | 1/1999 |
| DE | 199 56 176 A1 | 10/2001 |
| DE | 699 21 721 T2 | 11/2005 |
| DE | 10 2005 054575 B3 | 4/2007 |
| DE | 10 2008 062622 A1 | 6/2010 |
| DE | 10 2009 039104 A1 | 3/2011 |
| DE | 10 2010 063 222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| EP | 441397 A1 | 8/1991 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2548706 A1 | 1/2013 |
| EP | 2784612 A2 | 10/2014 |
| EP | 2851162 A2 | 3/2015 |
| EP | 2864085 A2 | 4/2015 |
| EP | 2868439 A1 | 5/2015 |
| JP | S60 123288 A | 7/1985 |
| JP | S61 252084 A | 11/1986 |
| JP | S62 87153 A | 4/1987 |
| JP | H08281580 A | 10/1996 |
| JP | 2000-218584 A | 8/2000 |
| JP | 2008-23642 A | 2/2008 |
| KR | 2014-0011973 A | 1/2014 |
| WO | WO 2007/082954 A1 | 7/2007 |
| WO | WO 2007/099511 A2 | 9/2007 |
| WO | WO 2009/124904 A1 | 10/2009 |
| WO | WO 2010/088959 A1 | 8/2010 |
| WO | WO 2011/107143 A1 | 9/2011 |
| WO | WO 2014/162161 A1 | 10/2014 |
| WO | WO 2014/170355 A1 | 10/2014 |
| WO | WO 2015/113757 A1 | 8/2015 |

OTHER PUBLICATIONS

Video titled "FANUC Robots Assemble Their Own Motors—FANUC Robotics" by FANUC America Corporation (Year: 2008).*
Video titled "Robotic System for Inspection & Assembly of Plastic Parts—Palladium Control Systems" by FANUC America Corporation (Year: 2015).*
Video titled "Fanuc Robot R-2000iB Car Body Assembly" by FANUC America Corporation (Year: 2012).*
Paper titled "Fiber-handling robot and optical connection mechanisms for automatic cross-connection of multiple optical connectors" by Mizukami et al. (Year: 2013).*
Video titled "RSP Swivel tool changer with FANUC LR Mate 200ID Vision" by Robot System Products (Year: 2014).*
Video titled "Automated Electronic Component Assembly, Courtesy of Calvary Robotics" by FANUC America Corporation (Year: 2015).*
Video titled "Robotic Assembly System for Electrical Wire Harnesses—Clear Automation" by FANUC America Corporation (Year: 2016).*
U.S. Appl. No. 15/752,574, filed Feb. 13, 2018, Haddadin et al.
U.S. Appl. No. 15/766,080, filed Apr. 5, 2018, Haddadin.
U.S. Appl. No. 15/766,083, filed Apr. 5, 2018, Haddadin.
U.S. Appl. No. 15/766,094, filed Apr. 5, 2018, Haddadin.
U.S. Appl. No. 16/077,705, filed Aug. 13, 2018, Haddadin.
U.S. Appl. No. 16/083,192, filed Sep. 7, 2018, Haddadin.
U.S. Appl. No. 16/095,326, filed Oct. 19, 2018, Haddadin.
U.S. Appl. No. 16/095,332, filed Oct. 19, 2018, Haddadin et al.
U.S. Appl. No. 16/095,622, filed Oct. 22, 2018, Haddadin.
U.S. Appl. No. 16/095,624, filed Oct. 22, 2018, Haddadin et al.
U.S. Appl. No. 16/340,916, filed Apr. 10, 2019, Böhme et al.
PCT/EP2016/069339, Oct. 17, 2016, International Search Report and Written Opinion.
PCT/EP2016/069339, Feb. 20, 2018, International Preliminary Report on Patentability.
PCT/EP2016/074250, Jan. 30, 2017, International Search Report and Written Opinion.
PCT/EP2016/074251, Feb. 2, 2017, International Search Report and Written Opinion.
PCT/EP2016/074252, Feb. 2, 2017, International Search Report and Written Opinion.
PCT/EP2017/059448, Aug. 1, 2017, International Search Report and Written Opinion.
PCT/EP2017/059448, Oct. 23, 2018, International Preliminary Report and Patentability.
PCT/EP2017/059446, Jul. 19, 2017, International Search Report and Written Opinion.
PCT/EP2017/059446, Oct. 23, 2018, International Preliminary Report on Patentability.
PCT/EP2017/059572, Jul. 27, 2017, International Search Report and Written Opinion.
PCT/EP2017/059572, Oct. 30, 2018, International Preliminary Report on Patentability.
International Search Report and Written Opinion for Application No. PCT/EP2016/069339 dated Oct. 17, 2016.
International Preliminary Report on Patentability for Application No. PCT/EP2016/069339 dated Feb. 20, 2018.
International Search Report and Written Opinion for Application No. PCT/EP2016/074250 dated Jan. 30, 2017.
International Search Report and Written Opinion for Application No. PCT/EP2016/074251 dated Feb. 2, 2017.
International Search Report and Written Opinion for Application No. PCT/EP2016/074252 dated Feb. 2, 2017.

(56) References Cited

OTHER PUBLICATIONS

International Search Report and Written Opinion for Application No. PCT/EP2017/059448 dated Aug. 1, 2017.
International Preliminary Report on Patentability for Application No. PCT/EP2017/059448 dated Oct. 23, 2018.
International Search Report and Written Opinion for Application No. PCT/EP2017/059446 dated Jul. 19, 2017.
International Preliminary Report on Patentability for Application No. PCT/EP2017/059446 dated Oct. 23, 2018.
International Search Report and Written Opinion for Application No. PCT/EP2017/059572 dated Jul. 27, 2017.
International Preliminary Report on Patentability for Application No. PCT/EP2017/059572 dated Oct. 30, 2018.
[No Author Listed], "Advanced Automation for Space Missions," NASA Conference Publication 2255, Aug. 29, 1980, pp. 1-335. Retrieved from https://ntrs/nasa/gov/archive/nasa/casi.ntrs.nasa.gov/19830007077.pdf on Jul. 7, 2017.
[No Author Listed], "FANUC," YouTube, Dec. 22, 2007. Retrieved from https://www.youtube.com/watch?v=-SREct281JM on Jul. 11, 2017. Supplemented by five .PNG images taken from video.
[No Author Listed], CNC Products and Services. Brochure. FANUC America Corporation. 2017. Retrieved Jan. 24, 2019 from https://www.fanucamerica.com/docs/default-source/cnc-files/brochures/cnc-products-and-services.pdf?sfvrsn=865fcl62_4.
Sakakibara, A two-armed intelligent robot assembles mini robots automatically. Industrial Electronics, Control, and Instrumentation. Proceedings of the 1996 IEEE IECON 22nd International Conference on Taipaei, Taiwan. 1996;3(5):1879-1883.
Schafer et al., Light-Weight Mechatronics and Sensorics for Robotic Exploration: a DLR Perspective. Feb. 25, 2008. Retrived from http://elib.dlr.de/55362/1/i-sairas2008_Schafer.pdf on Mar. 24, 2017.

* cited by examiner

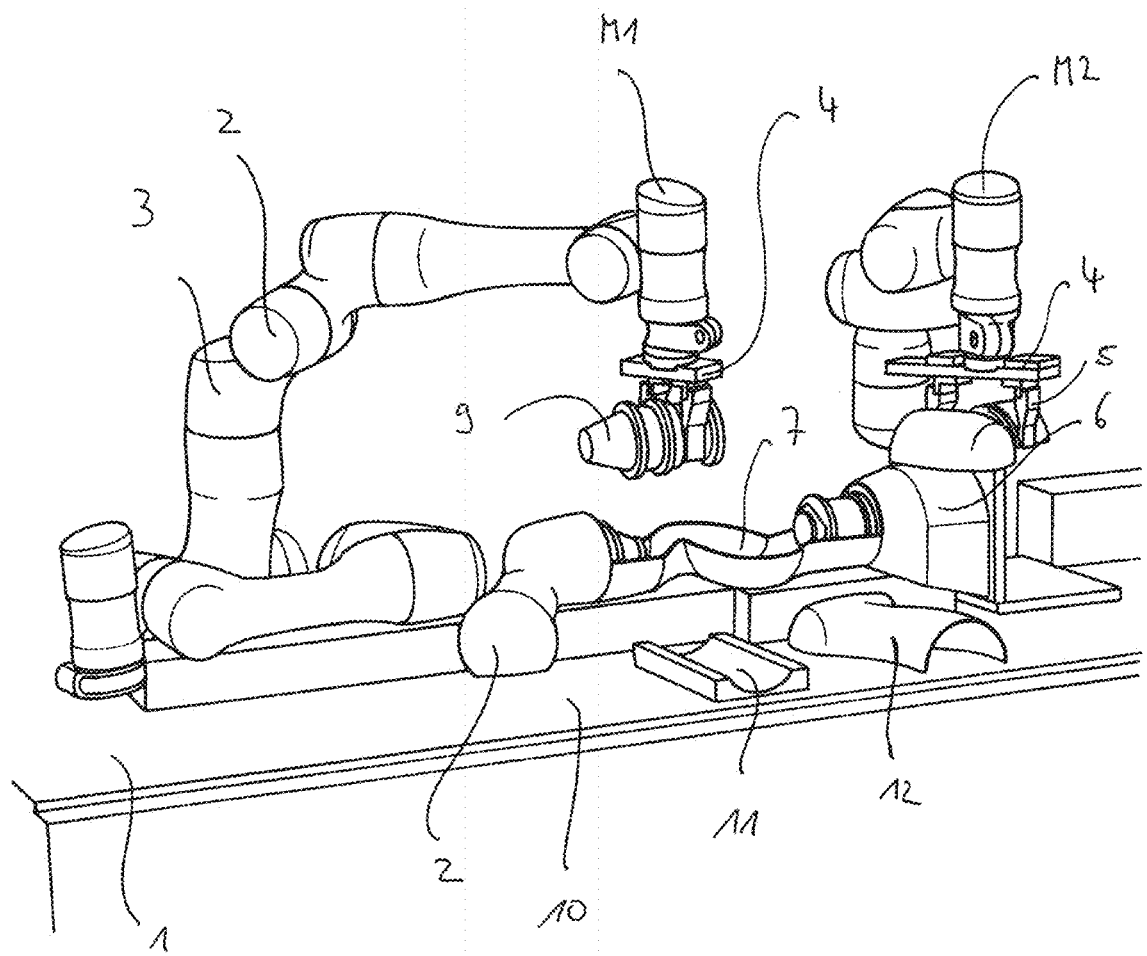

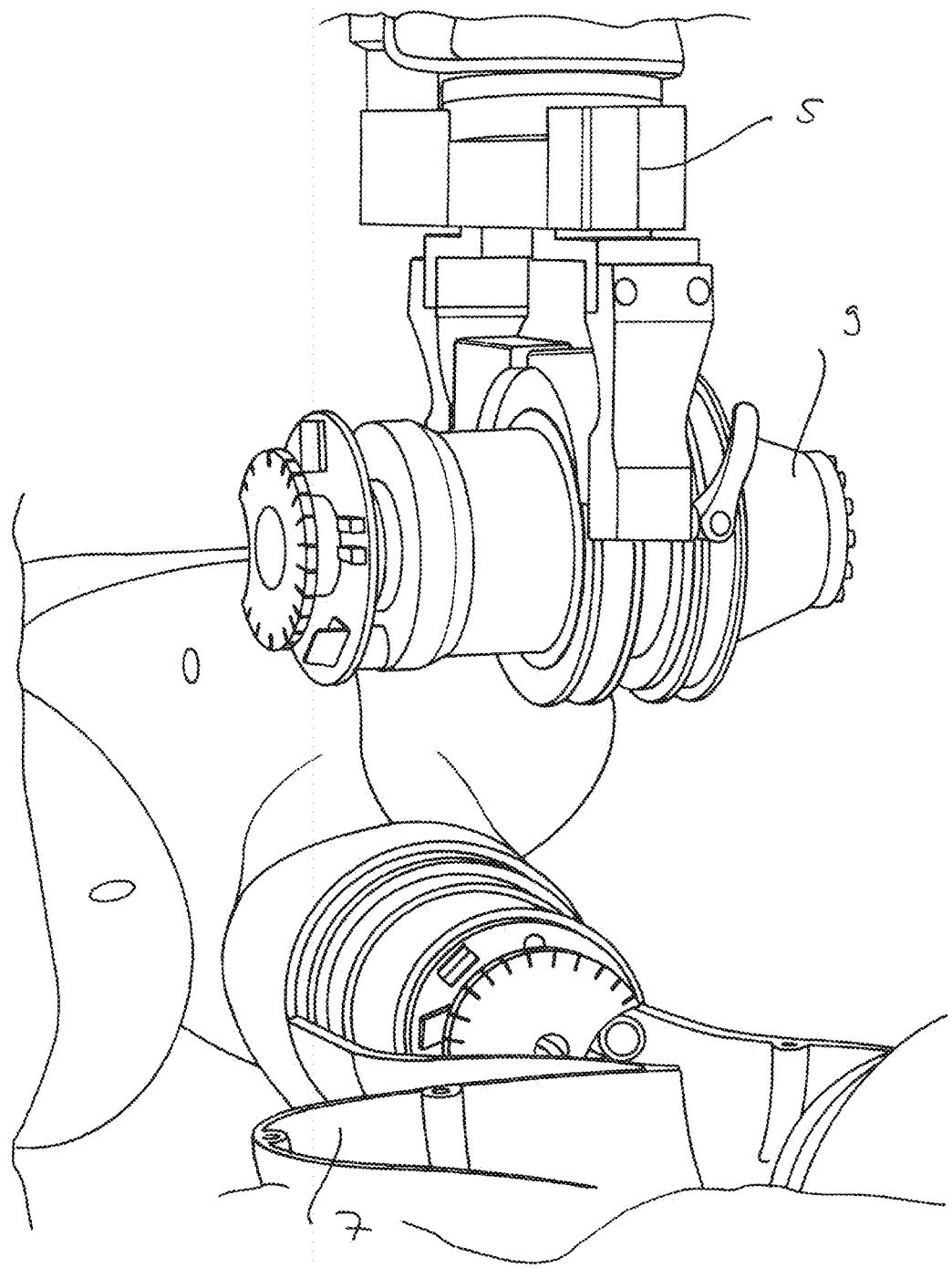

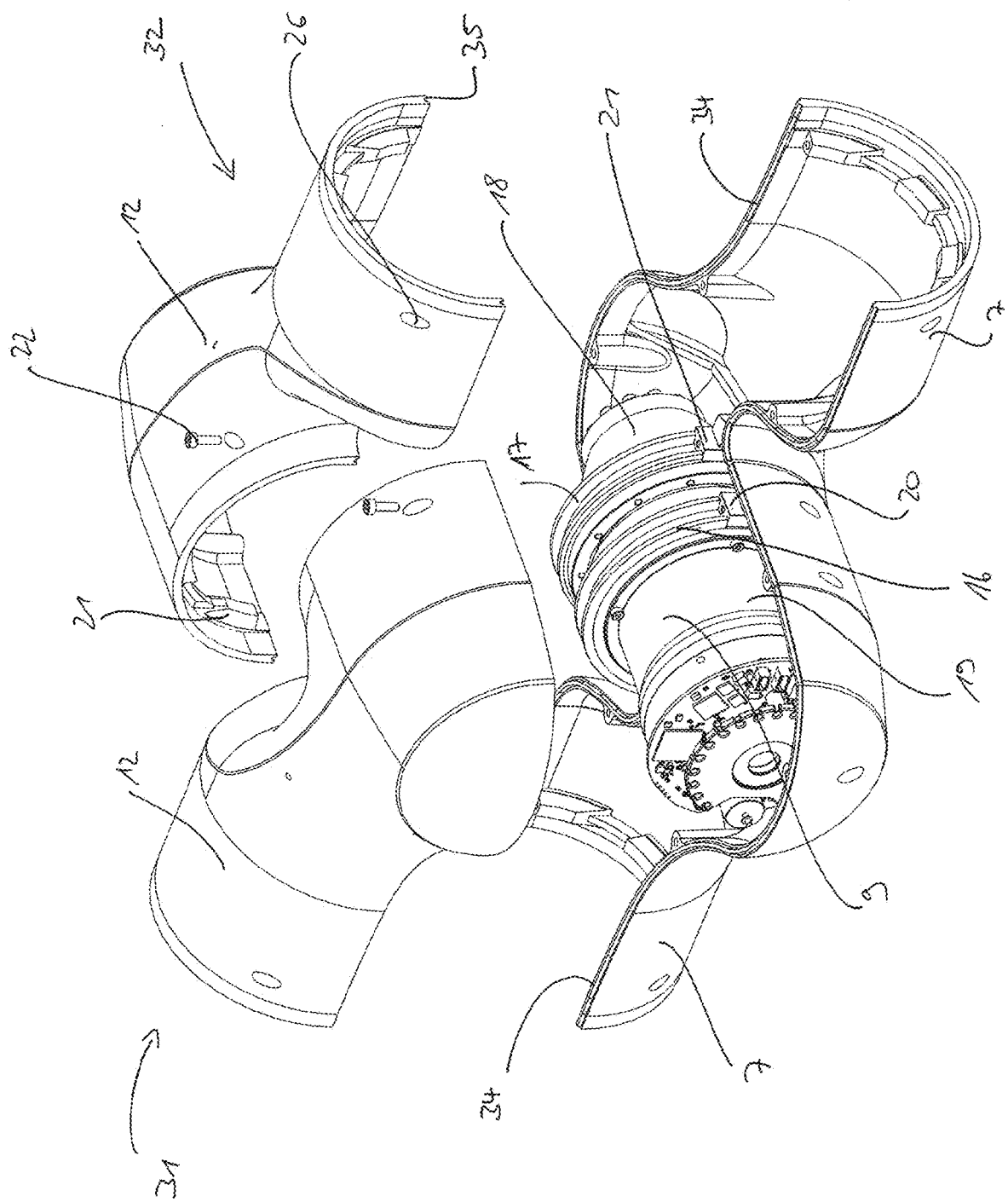

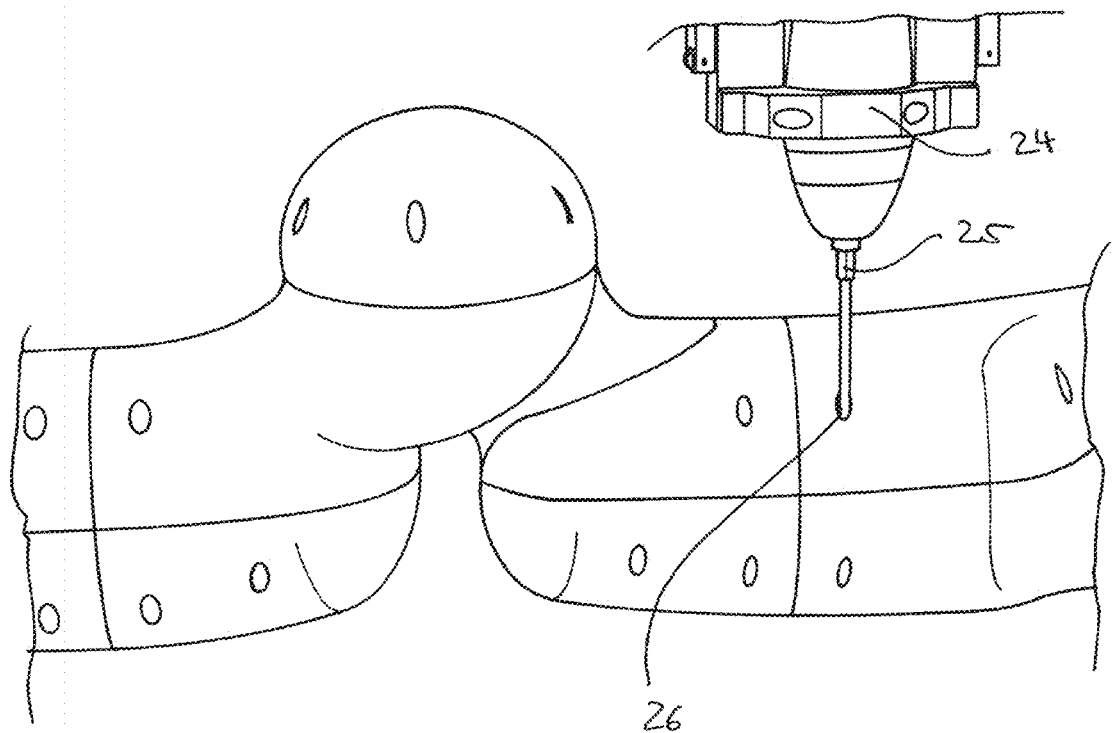

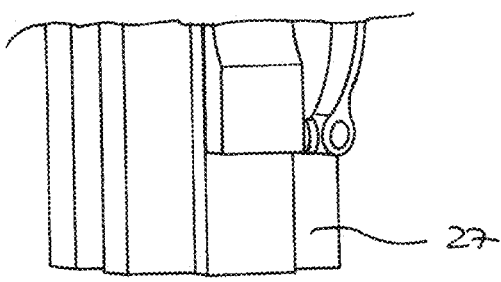
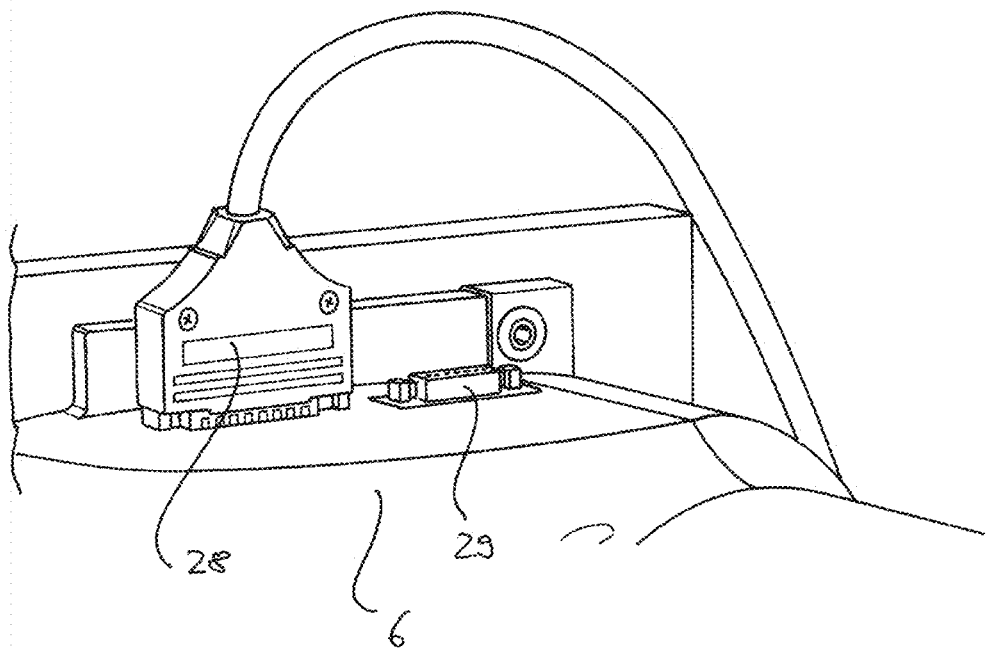

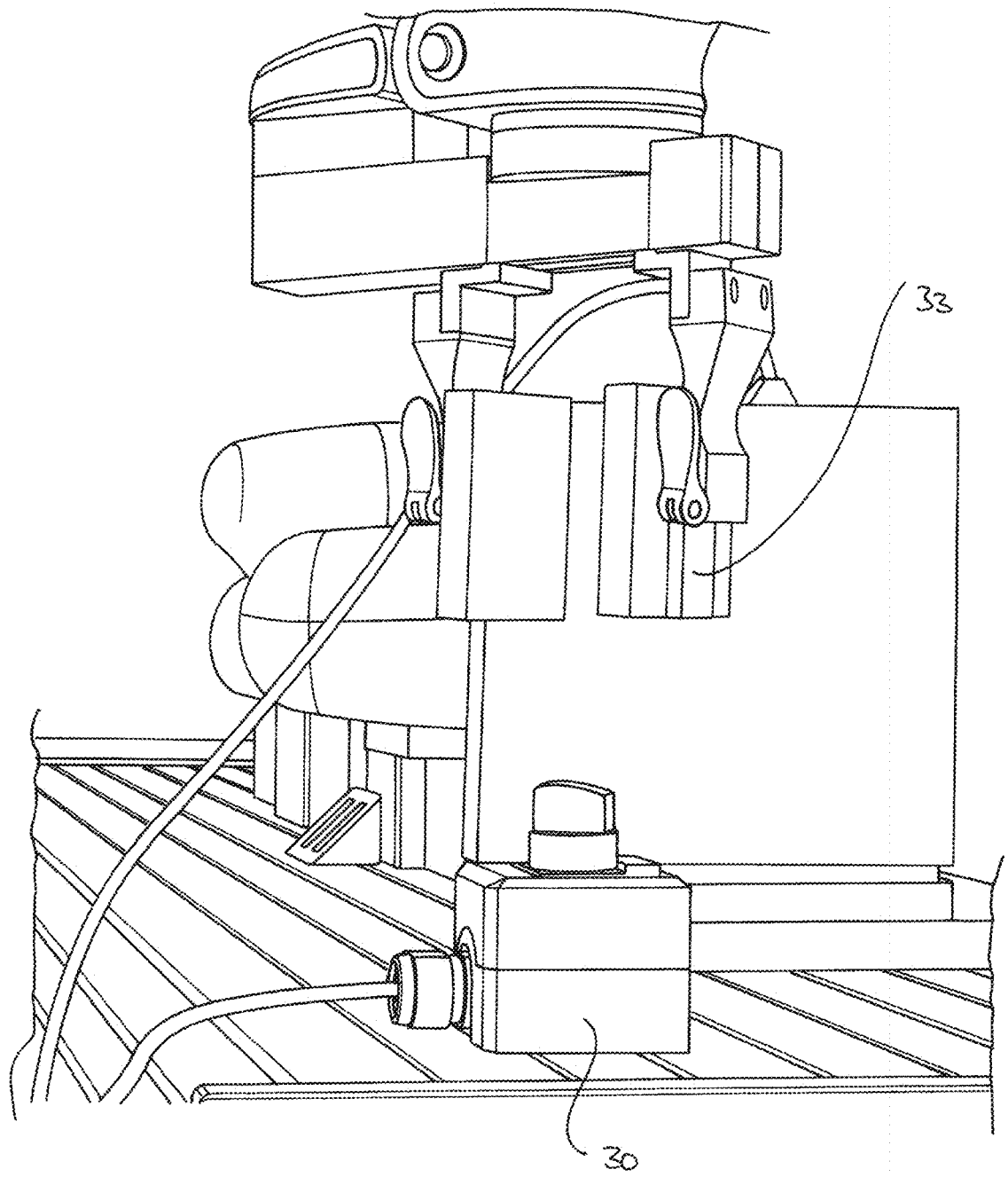

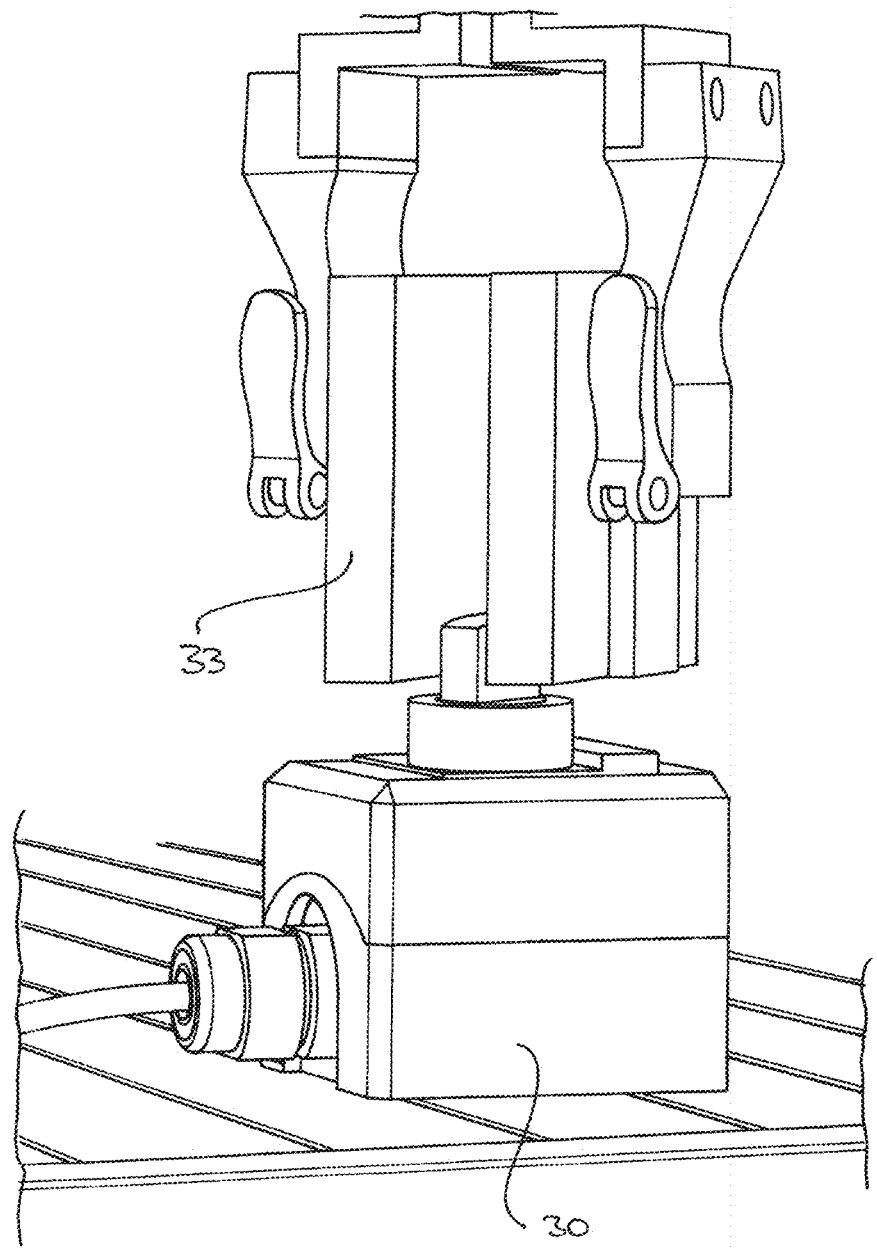

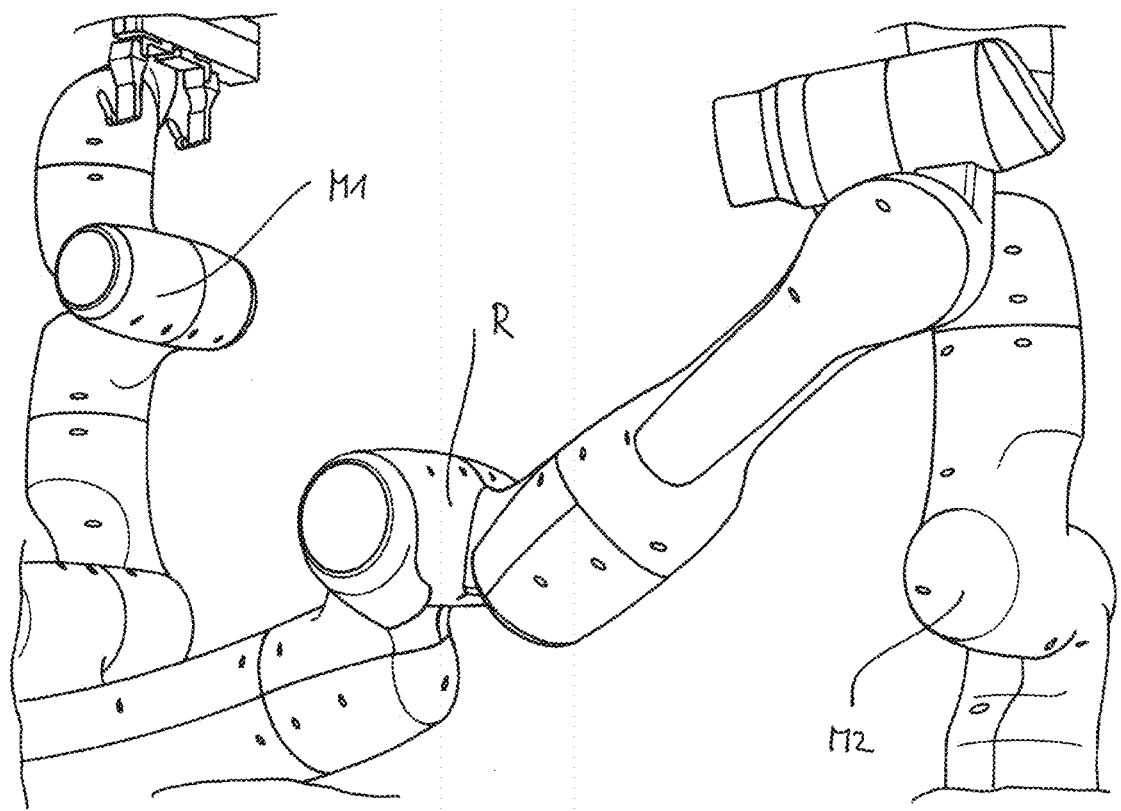

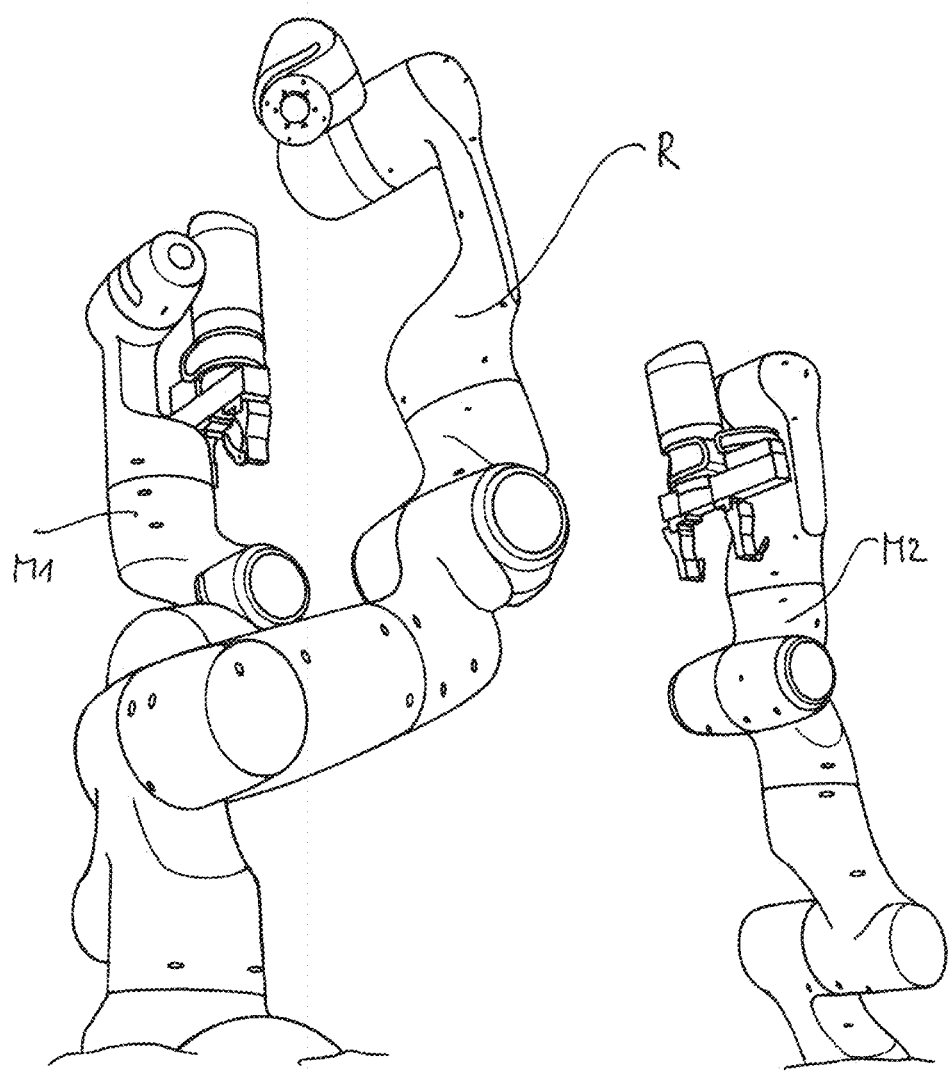

METHOD FOR PRODUCING A ROBOT AND DEVICE FOR CARRYING OUT SAID METHOD

RELATED APPLICATIONS

This application is a national stage filing under 35 U.S.C. § 371 of International Patent Application Serial No. PCT/EP2017/059449, filed Apr. 20, 2017, entitled "Method for Producing a Robot and Device for Carrying out said Method," which claims priority to German application serial number 10 2016 004 788.7, filed Apr. 20, 2016. Each of these is incorporated herein by reference in its entirety.

The present invention relates to a method for manufacturing a robot and a device allowing such a method to be carried out.

In state-of-the-art methods for manufacturing a robot, such as of a robotic arm or a lightweight manipulator, the individual components such as drive units, housing structures, sensor units, cabling, etc. are usually assembled by hand with the aid of assembly tools. A fully automated assembly is hardly feasible for such robots, since the radially closed housing structures of the individual axis elements only allow a very complicated assembly. The axis links are only accessible from their respective open end faces.

Based on this, the present invention has the objective of providing a novel method for the manufacture of a robot, whereby the steps of the manufacturing method should be capable of being carried out at least predominantly independently by machine, preferably the entire manufacturing method shall be carried out completely automatically. Furthermore, the invention has the objective of providing a corresponding device with which this novel method can be carried out.

Preferably, but not exclusively, the invention relates to a method for the manufacture of a lightweight robot, in particular for the manufacture of a robotic arm or manipulator for such a robot.

This object is solved by a method for manufacturing a robot according to claim 1, by a robot according to claim 13 produced by this method and by a device for carrying out the method for manufacturing a robot according to claim 14.

The method according to the invention relates to a robot having at least one multi-axis robotic arm or manipulator consisting of a plurality of axis members movably arranged relative to each other each forming an axis of the robotic arm, at least part of the axis members being constructed of at least two complementary housing segments each having at least one of their ends a support or bearing device for receiving a drive unit, and is further characterized by at least one of the steps:
- arranging first housing segments in an order provided for the robotic arm;
- inserting the drive units into the first housing segments while connecting the drive units to the support devices of the first housing segments provided for this purpose;
- mounting the respective complementary second housing segments onto the first housing segments comprising the drive units while connecting the drive units to the support devices of the second housing segments provided for this purpose; and
- fixing the second housing segments to the first housing segments by means of fixing means, whereby the drive units are fixed in the axis members;

the method steps being automatically executable by at least one assembly robot.

The method in accordance with the invention is preferably made possible by the fact that the housing structures of individual axis members of the manipulator are designed and constructed in such a way that they are at least partially open along their axis and thus accessible, e.g. by at least two form-complementary, half-shell-like housing halves which are assembled in the course of assembly, as this is described e.g. in the German patent application No. 10 2015 012 960.0, the disclosure content of which is expressly referred to herein.

In the case of the generally completely self-contained and closed housing structures of axis members of state of the art robot manipulators, the assembly of the units, cabling, etc. is only possible from one of the open end faces of the axis members, whereby in addition, there are assembly openings which can be closed by covers, but which reduce the strength and torsional stiffness of the housing. The assembly of a manipulator in such robots is extremely cumbersome due to the difficulty of access to the inside of the housing and is even detrimental to the economically viable automation of the manufacturing process.

For an automated insertion of the drive units into the open housing segments it is advantageous, according to the invention, if the drive units are pre-assembled as a module and have corresponding connecting elements which form a positive and/or non-positive connection with connecting elements arranged in or on the housing segments during the insertion of the drive units, which connection elements determine the position of the drive units in the housing segments before the upper housing segments are placed on top.

For this purpose, for example, the drive units may be designed and constructed so as to have connecting elements in the form of circumferential annular grooves which can be connected in a force- and torque-transmitting manner to a housing portion of a first axis member and to a housing portion of a second axis member, the second axis member being rotatably mounted with respect to the first axis member, and the connecting elements being constructed so as to cooperate with the axis members in the radial direction with respect to the axis of rotation of the drive device.

The pre-assembled drive units may have standardized connections and the housing segments may have receptacles or guides which enable that the at least one assembly robot to independently attach electrical cables and/or media cables and/or sensor modules to the drive units already inserted and/or in the housing segments.

Manipulators of robots, especially of lightweight construction, usually have a foot-like base element on which the multi-axis robotic arm is arranged. The end effector of the manipulator is to be provided opposite the base element. The method according to the invention can therefore also comprise the steps that can be performed by the at least one assembly robot, in which a base element is attached to the lower axis member of the robotic arm and/or an effector receiving element for the end effector is attached to the upper axis member of the robotic arm.

In an embodiment of the method in accordance with the invention, the method is designed in such a way that the at least one assembly robot automatically removes the components required in each case for the individual assembly steps (housing parts, drive modules, sensor modules, connecting or fastening elements, cables or lines, etc.) for the robot to be produced and/or the various tools or effectors required for this from a stationary and/or mobile storage.

Stationary storages or shelves can be formed, for example, by brackets located in the work area of the assembly robot.

However, it is also conceivable to have mobile storages, such as assembly lines, which guide the parts to be picked up past the assembly robot, depending on the assembly step, whereby the sequence of the parts can also be selected arbitrarily.

All commercially available tools can be used as tools, which can be picked up by the assembly robot e.g. by means of an appropriately distinctive gripping mechanism.

It has to be emphasized that according to the invention, the assembly robot does not require any individualized tool parts and corresponding connections intended for its use and serving as an effector, but can use tools freely available on the market, such as conventional cordless screwdrivers, as described in detail below and which have their own inventive significance. The tools themselves can also be provided in holders provided for this purpose in the area of the assembly robot.

In this context, the method according to the invention also provides that, depending on the assembly steps to be performed, the at least one assembly robot automatically changes the effectors or tools required for the individual assembly steps.

For example, it can use appropriately shaped gripper jaws for picking up and inserting the drive units and differently shaped gripper jaws for picking up an electric screwdriver and feeding the screwdriver to the appropriate positions for screwing together the housing segments, whereby the gripper mechanism of the assembly robot then picks up these gripper jaws from the appropriate locations as required and uses them according to their intended application.

For this purpose, the assembly robot has a gripping mechanism on its end member of the manipulator which is designed so that different gripper elements or jaws can be picked up, which are directed at the respective element to be picked up or activity to be performed. The gripper jaws can be replaced independently by the assembly robot via a type of universal connection, as described, for example, in the German patent application No. 10 2016 004 087.4, the disclosure content of which is expressly referred to herein.

In other words, the gripper jaws for receiving and inserting the drive units are adapted in their contours to the external shape of the drive units, while the gripper jaws for receiving a screwdriver for connecting the housing segments by means of screws are adapted in their contours to the shape or handle of the screwdriver. Other gripper jaws with different designs can also be used to make electrical and media connections or even to actuate external switches in the area of the assembly device.

Since the assembly robot is designed to accommodate individualized gripper jaws, the method in accordance with the invention may also comprise the steps which can be carried out by the at least one assembly robot, and by means of which steps the robot, which is fully assembled in terms of its housing structure, can be connected to a power supply and/or data supply and/or media supply, the assembly robot also using corresponding gripper jaws here.

If the robot to be assembled is fully assembled, i.e. all mechatronic components are inserted and connected, and the housing segments are connected and fastened, the method according to the invention may further include the step which can be performed by at least one assembly robot, and in which step at least one functional test for the assembled robot is activated.

The assembled robot is supplied with power, for example, by the assembly robot independently actuating an external switch, so that a test routine can be carried out by test software, which checks whether all drive units, sensor modules, etc., and the associated electrical contacts exist or function correctly.

Finally, according to the method of the invention, it may be provided that the assembled robot, which preferably consists only of the base element and the manipulator arranged on it, is erected by the assembly robot. In this case, the base element can be articulated on an abutment of the assembly device so that the manipulator is quasi tilted about the axis of the abutment by the assembly robot.

However, in a preferred embodiment of the method according to the invention, it is provided, since the assembled robot contains all drive units and connections in a functional arrangement after a successfully passed functional test, if necessary, that the assembled robot is supplied with power and thereby automatically straightens up into a defined position, taking into account a pre-programmed motion sequence, before it can then be removed from the assembly device or moved away from it by means of a conveyor device.

All the assembly steps mentioned above can preferably be carried out using at least one assembly robot which is compliant and/or sensitive in design.

Robots with position-controlled axes are not suitable for the manufacturing method according to the invention, since for position control the forces acting on the robot from the outside must be measured, which form the basis for a desired dynamic behavior that is then transmitted to the robot via inverse kinematics, also called admittance control. In the present case, the programming effort would be too high for a single assembly robot due to the fact that the assembly activities have to be carried out at many different positions and alternate in nature. The required position control would have to be highly precise so that the individual robot-side and tool-side or effector-side coupling elements for changing the tools or gripper jaws and for carrying out the individual assembly steps described above, such as in particular inserting the drive units into the open housing segments with simultaneous joining of the connecting elements provided for this purpose, positioning of the complementary housing segments, etc., could be implemented at all. Due to the control principle used, such robots are therefore not in a position to detect errors or deviations, for example if, for some reason, the actual position of the open housing segment for pressing in a drive unit deviates slightly from the target position provided for this purpose in order to react accordingly. The housing segments can preferably be connected to each other via a tongue-and-groove connection, which in addition does not have to run linearly along the dividing line between the segments and does not necessarily have to run in one plane. Joining to form the tongue-and-groove connection is almost impossible using a strictly position-controlled robot, especially since the shape of the individual axis elements and thus of the housing segments and therefore the course of the dividing lines of the tongue-and-groove connection differ for each axis of such a robot. A perfect insertion of the drive units or other components into the housing segments and the exact merging of the housing segments as well as the screw connections of the housing segments would only be possible if the effectors or tools for this purpose were stored exactly in the position specified by the programming, for example in a stationary holding device arranged in the working area of the robot, and if the robot to be mounted or the corresponding housing segments were also located in corresponding stationary holders or positions. Even the use of a tool magazine with several exchangeable, possibly different tools or effectors (gripper, gripper jaws, screwdriver, pushbutton etc.) would considerably increase the programming effort and thus the susceptibility to errors.

According to a preferred embodiment of the method according to the invention, at least one assembly robot, preferably all assembly robots used, should have such an integrated compliance control or be equipped with intrinsic compliance or with a combination of active and passive compliance, which is why assembly should also be preferably, but not exclusively, carried out by such programmable multi-axis robots, preferably lightweight robots.

For example, the compliance control is based on the so-called impedance control, which, in contrast to the admittance control already mentioned, has as its object torque control at joint level. Depending on the desired dynamic behaviour and taking into account the deviations of an actual position from a defined nominal position and/or an actual speed from a nominal speed and/or an actual acceleration from a nominal acceleration, forces or moments are determined which are then mapped via the known kinematics of the assembly robot, which results from the number and arrangement of the joints and axes and thus degrees of freedom, to corresponding joint torques which are set via the torque control. The torque sensor elements integrated in the joints for this purpose record the one-dimensional torque prevailing at the output of the gearbox of the drive unit located in the joint, which can take the elasticity of the joint into account as a measured variable within the framework of the control. In particular, the use of an appropriate torque sensor device, in contrast to the use of only one force torque sensor at the end effector, as in admittance control, also permits the measurement of forces which are not exerted on the end effector but on the members of the assembly robot as well as on an object held by or to be processed by the assembly robot. Torques can also be measured by force sensors in the structure and/or base of the robot system. In particular, joint mechanisms between the individual axes of the manipulator can also be used, which allow multi-axis torque measurement. Also conceivable are translational joints equipped with corresponding force sensors.

The regulation of compliance and sensitivity realized in this way proves to be advantageous for the invention in question in many respects.

In principle, such a compliance control allows the assembly robot used for the intended manufacturing process or for individual method steps to be enabled to carry out its own controlled movements, whereby these own movements then correspond to individual assembly steps, such as e.g. inserting or pressing the drive units into the housing segments, linking the internal connections of the drive units, connecting the external connections, inserting or guiding the cabling in the housing segments, actuating functional switches or the like and in particular screwing the housing segments together. All this is combined with an independent change of different tools or effectors, e.g. different gripper jaws.

In addition, such an assembly robot is capable of "searching" for and "sensing" the different positions of the robot to be assembled, in particular with respect to an exact alignment of two housing segments of an axis member to be assembled with one another, when the tongue-and-groove connection is joined and when, for example, the fastening elements are inserted into openings of the housing segments provided for this purpose, as well as when the tool is guided relative to the openings, and of "searching" for positions on the assembly device and also for tool elements or effectors and "sensing" them without damage.

In this way, any number of functionally different assembly steps can be carried out by one and the same assembly robot.

A further advantage of the compliance control is that it basically permits a less precise or not exactly positioned coupling or connection between the components and connecting elements, whereby these can be manufactured with higher tolerances. The inaccuracies caused by this can be compensated in an appropriate manner by means of a correspondingly compliant control by reducing the contact forces when connecting the components, e.g. when inserting the drive units into the housing segments open on one side, inserting the connecting elements provided therein, such as slot or groove blocks, into the ring grooves, and also when forming the tongue-groove connection between the housing segments. The same applies to screwing the housing halves together when the tool, e.g. the screwdriver attachment of a cordless screwdriver, is inserted into the openings.

The stationary position or changing position (e.g. with a conveyor belt) of the individual components for the robot to be assembled in the area of the assembly device, the respective positions of the effectors or tools likewise arranged thereon, the position of actuating switches and connections, in each case also in relation to the position of the assembly robot, as well as the poses to be assumed by the assembly robot in each case within the scope of assembly, determine the motion sequences to be performed by the assembly robot as well as their accuracy. All these parameters must be taken into account in a coordinate system assigned to the assembly robot, whereby the selection of the type of coordinates (e.g. Cartesian, cylindrical, spherical coordinates) is determined by the desired behaviour of the assembly robot in the task space provided for this purpose, whereby different assembly steps can then define different task spaces. The behaviour of the assembly robot is based on a corresponding compliance control, which is why robots with such an integrated compliance control, especially lightweight robots, are particularly suitable for use as assembly robots in the invention-based method.

In accordance with a particularly preferred embodiment of the method according to the invention, it is intended that at least one assembly robot be identical in design to the robot to be assembled. It is therefore preferable to use a lightweight robot.

In other words, the assembly robot, supported by the compliance control and sensitivity described above, is capable of replicating itself. By providing an appropriate assembly device with, if necessary, continuously fed components, a robot of this type can be manufactured and duplicated by shortening cycle times and thus significantly reduced production costs.

In this context, the invention also concerns a device for producing a robot which has at least one multi-axis robotic arm which consists of a plurality of axis members which are arranged so as to be movable relative to one another and each form an axis of the robotic arm, at least some of the axis members being constructed from at least two complementary housing segments which each have at least one of their ends a support or bearing device for receiving a drive unit, with at least one assembly robot which is designed to carry out various assembly steps for manufacturing the robot; and with a working space which is assigned to the at least one assembly robot, wherein the working space comprises a holding device for at least one housing segment of the robotic arm, preferably, in sections, a plurality of holding devices for a plurality of housing segments of successive axis members of the robotic arm.

It may be provided that the holding device(s) is/are at least partially complementary to the contour of the housing segments of the axis members of the robotic arm.

Ideally, the holding devices are designed so that they position the manipulator or robotic arm of the robot to be mounted horizontally in its longitudinal extension, preferably with all the axis members of the manipulator being in a common plane, which facilitates the insertion of the respective components into the open housing segments and the positioning of the upper housing segments completing the axis members.

In order to prevent the position of the manipulator, which consists of several adjacent open housing segments, from possibly changing during the execution of individual assembly steps, such as pressing in the drive units, an abutment for each of the two ends of the manipulator is provided on the holding device so that the latter is fixed in its axial, horizontal position.

An abutment for the base element of the robotic arm can be designed in such a way that the assembled robotic arm can be tilted by means of the assembly robot around this abutment into a defined, preferably upright or vertical position, the assembly robot being able to engage the effector on the side opposite the base element for this purpose.

In the area of the working area, at least one storage area is provided for the components for the assembly of the robot, in which these, such as the drive units, are stationarily stored. Preferably at least one conveyor device is provided in the area of the working space assigned to the assembly robot, along which the components for the assembly of the robot can be moved continuously or in a clocked manner.

Furthermore, in the region of the working space assigned to the assembly robot, at least one holder or magazine for various effectors and tools (screwdriver, gripper mechanism with several exchangeable gripper jaws, etc.) can be provided, which the at least one assembly robot uses independently.

In a preferred embodiment of the assembly device according to the invention, at least two assembly robots are provided, which are either assigned to a common working space or which each define an independent working space within the assembly device. The assembly robots can be designed to carry out different or similar assembly steps simultaneously or sequentially. For example, it is conceivable that one assembly robot only serves to insert or press in the drive units, while the other assembly robot only serves to place the upper housing segments after the drive units have been inserted and, if necessary, connected, and that, in addition, another assembly robot serves to screw together the housing segments. This considerably reduces the cycle times.

According to the invention, the method described above should preferably be carried out fully automatically, i.e. the assembly robot(s) assemble another robot, preferably of the same type, independently. However, some of the manufacturing steps mentioned above can also be performed manually by a human, while the assembly robot(s), which have a corresponding compliance control and are therefore suitable for such a human-robot collaboration, are used for further support.

Further features and advantages of the invention result from the following description of the embodiments shown in the enclosed drawings.

FIG. 1a is a perspective view of a device for manufacturing a robot according to the invention;

Figure 2A:
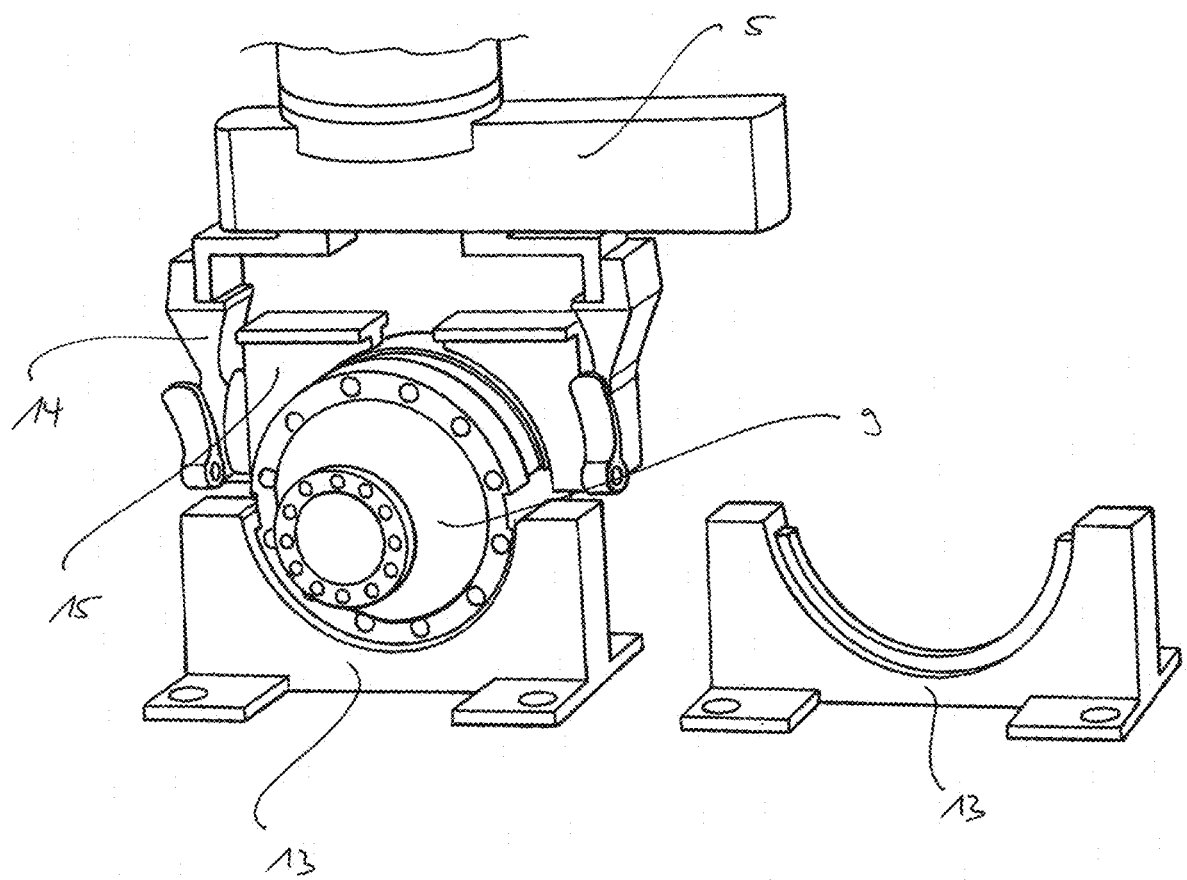
Figure 4A:
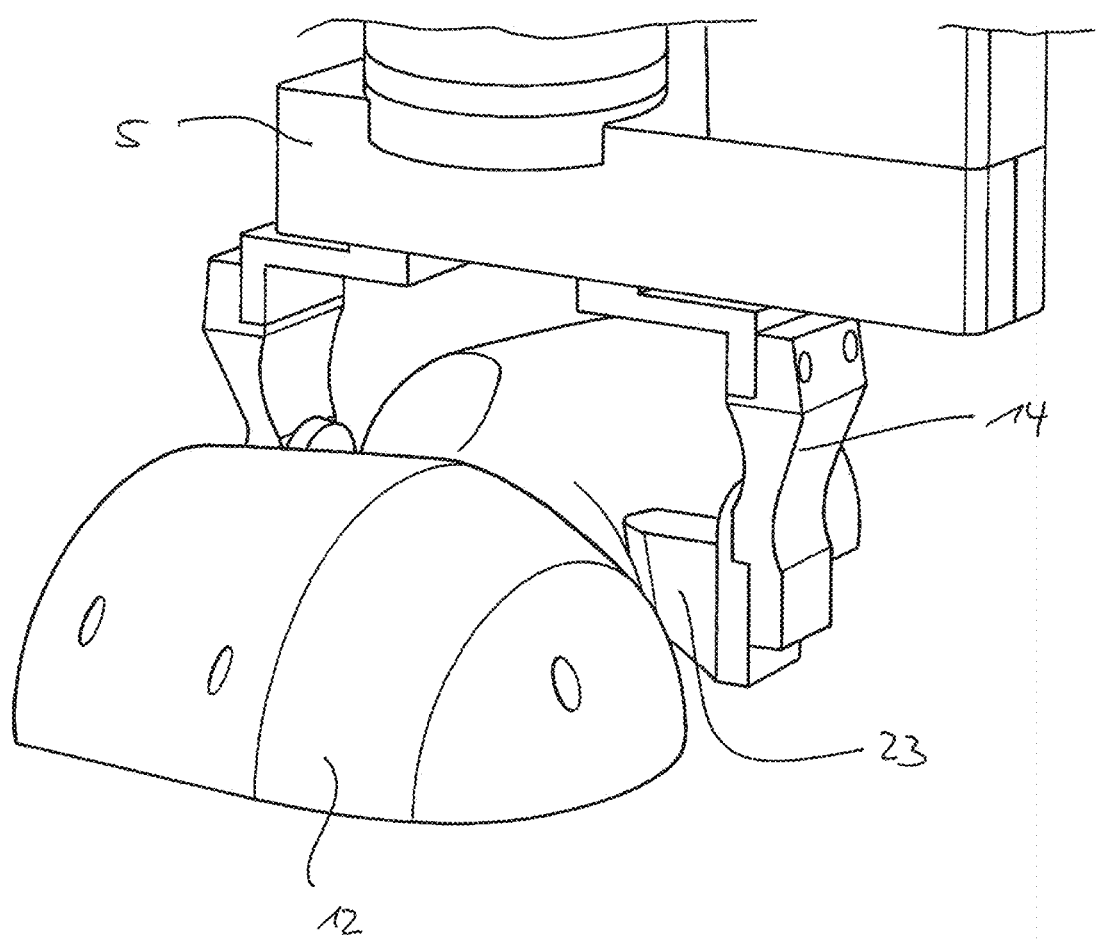
Figure 5A:
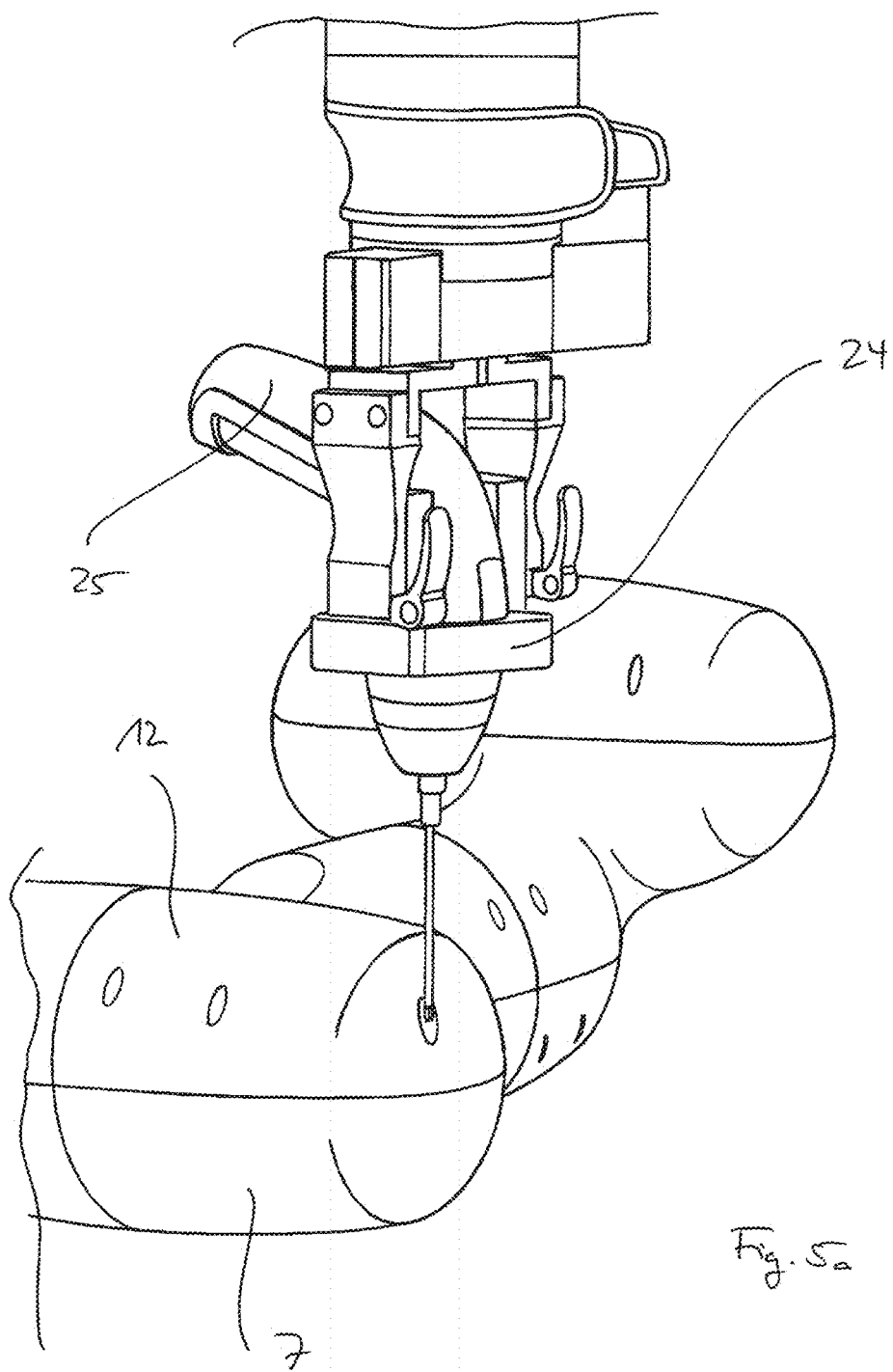
Figure 6A:
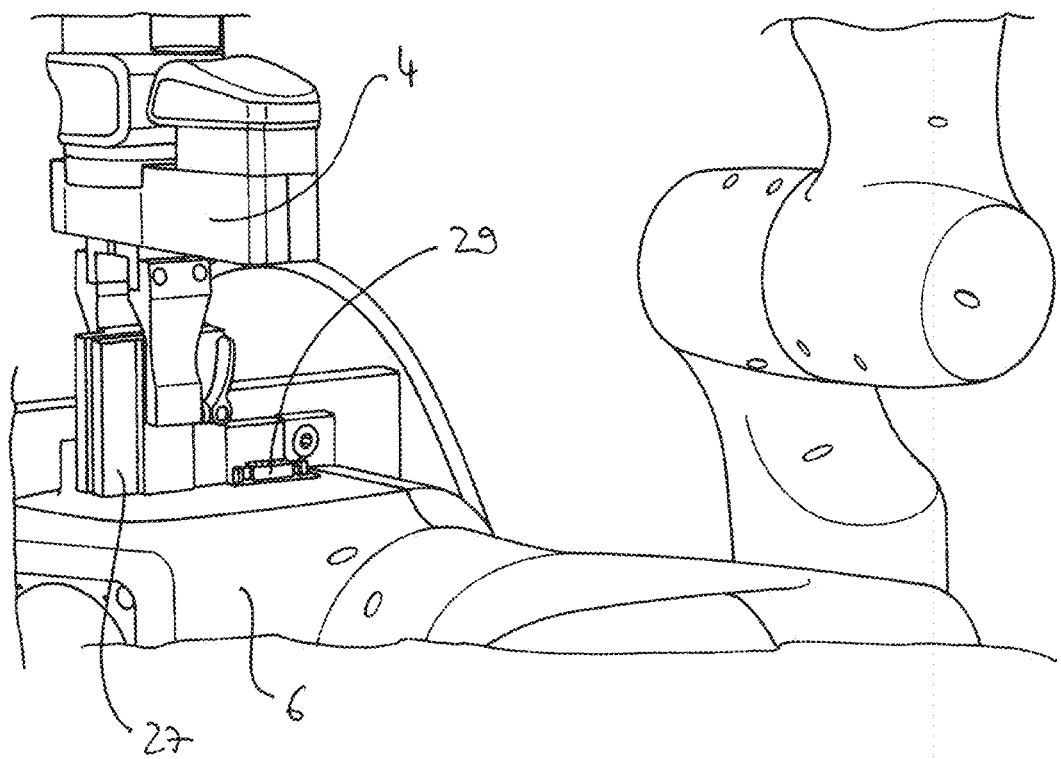

FIGS. 2a, b and c are illustrations relating to the performance of a step of the method of manufacturing a robot according to the invention in which a drive unit is to be inserted into a housing segment;

FIG. 3 is an explosive view of a schematic structure of housing segments of the robot to be manufactured;

FIGS. 4a, b and c are illustrations relating to the performance of a further step of the method of manufacturing a robot in accordance with the invention in which a housing segment is to be placed on another housing segment;

FIGS. 5a and b are illustrations relating to the performance of a further step in the method of manufacturing a robot in accordance with the invention in which housing segments are to be bolted together;

FIGS. 6a and b are illustrations relating to the performance of a further step in the method of manufacturing a robot in accordance with the invention in which a connector plug is to be mounted on the robot;

FIGS. 7a and b are illustrations relating to the performance of a further step in the method of manufacturing a robot in accordance with the invention in which a switch is to be operated; and FIGS. 8a and b are illustrations relating to the performance of a further step of the method of manufacturing a robot in accordance with the invention in which the assembled robot is to stand up independently.

Figure 1B:
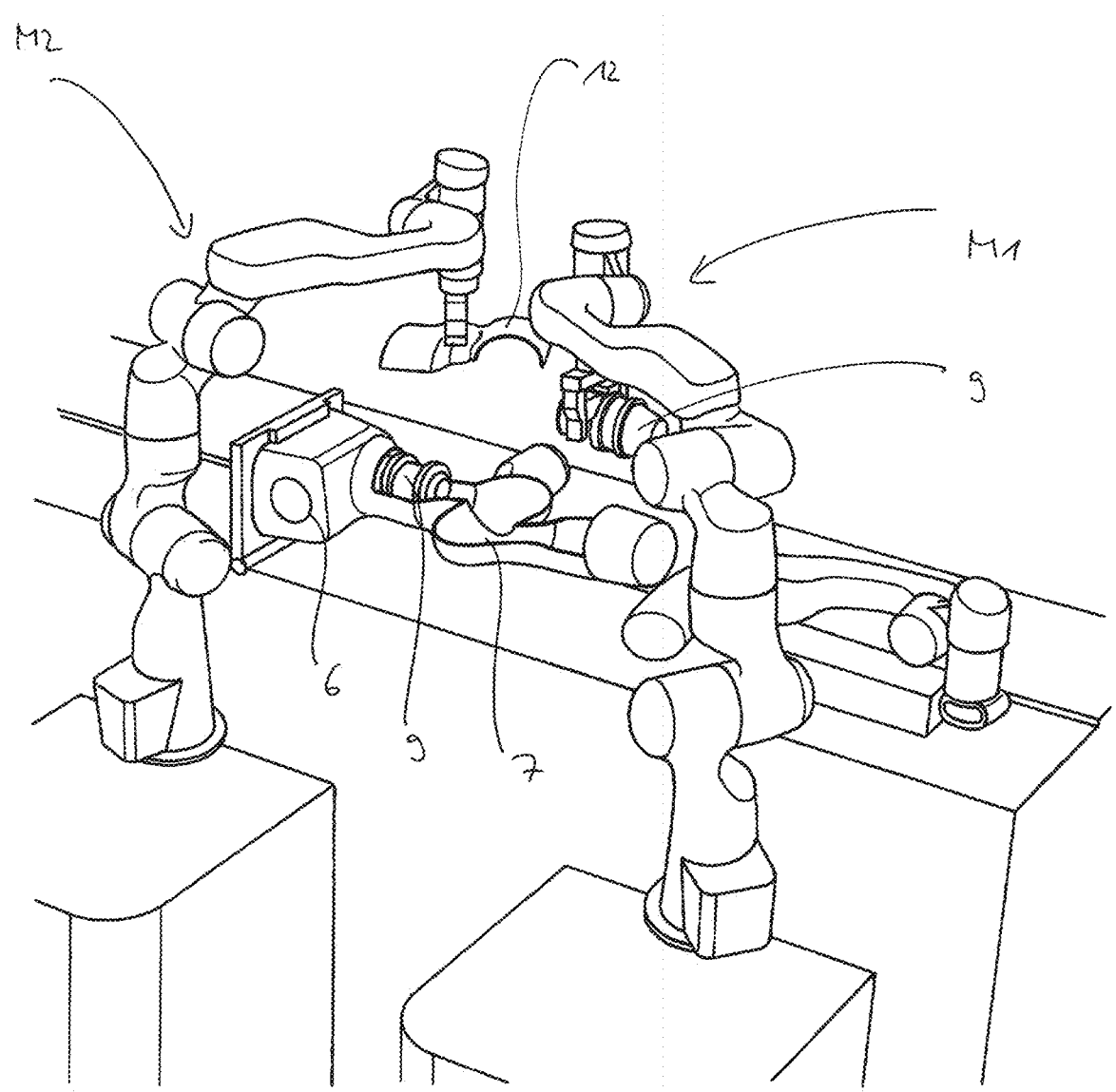
FIG. 1b is another perspective view of a device for manufacturing a robot according to the invention.

FIGS. 1a and 1b each show an example of a device for carrying out the method according to the invention.

Two assembly robots M1 and M2 are positioned on an assembly table or work area 1, respectively, which are used for the assembly of another robot R.

The assembly robots M1 and M2 are robots with a manipulator 2 consisting of several axis links or elements 3 and an effector 4 at its end, which in this case carries a gripping mechanism 5. The two assembly robots M1 and M2 are lightweight robots equipped with an appropriate compliance control.

As can be seen, preferably, but not necessarily a robot R of the same type as the two assembly robots M1 and M2, i.e. a manipulator 2 consisting of several axis members 3, at the end of which an effector 4 is also provided and a base element 6 opposite this effector 4, is to be assembled according to the manufacturing method according to the invention.

The two assembly robots M1 and M2 are arranged and programmed in such a way that they can carry out the assembly steps intended for them simultaneously or one after the other.

The robot R to be mounted is supported essentially horizontally with its lower housing segments 7 on a holding device 8, so that the upwardly open housing segments 7 of adjacent axis members 3 continuously provide a receiving surface for the drive units 9 to be inserted in the joint regions between two axis members 3, a common dividing line running essentially in one plane being formed.

In a first step of the method in accordance with the invention, the lower housing segments 7 for the manipulator 2 can be picked up by the assembly robots M1 and M2 from a support or holder, e.g. by a conveyor belt 10 passing them, and deposited on the holding device 8 in the orientation and sequence provided for the structure of the manipulator 2.

The conveyor belt 10 can have mounting brackets 11 for the drive units 9, while the upper housing segments 12, for example, can be loosely placed on the conveyor belt 10.

In addition to such a mobile support, however, it is also conceivable that the drive units 9 are placed on a stationary bracket 13 in the area of the mounting device, as shown in FIG. 2a.

In this holder 13 the drive unit 9 is stored in such a way that the gripping mechanism 5 of one of the assembly robots M1 or M2 can securely grip the housing of the drive unit 9 by providing corresponding gripper jaws 15 on gripper fingers 14 of the gripping mechanism 5, which are complementary to the contour of the housing of the drive unit 9.

Figure 2C:
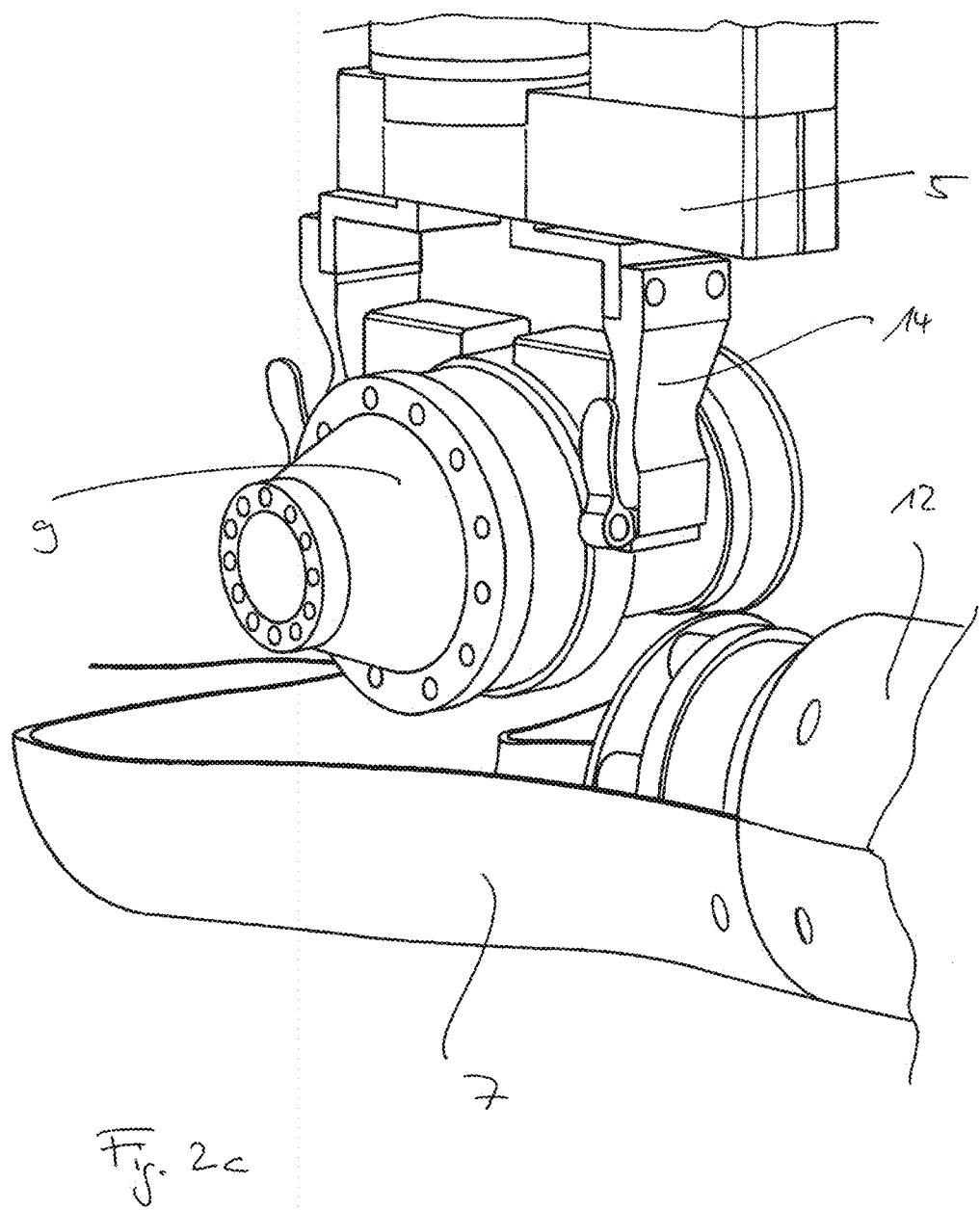

As shown by the sequence of movements illustrated by the illustrations of FIGS. 2a, 2b and 2c, the assembly robot M1 or M2 removes the drive unit 9 from the holder 13 (FIG. 2a) and guides it to the joint between two adjacent axis elements 3 (FIG. 2b), in which the two lower housing segments 7 are open at the top, and inserts the drive unit 9 in this joint region (FIG. 2c).

Such an automated assembly of the drive units 9 is possible because the housing structure of an axis member 3 of the robot 2 to be assembled is composed of two half-shell-shaped housing halves or segments 7 and 12 on the one hand, and because the drive units 9 including motor, gearbox, control, output housing and, if necessary, further components are pre-assembled as a modular unit on the other hand.

This concept, which has its own inventive significance, is illustrated in FIG. 3, which schematically shows the structure of a joint between two adjacent axis elements 31 and 32 for a manipulator 2 of the robot R to be mounted.

Both axis members 31 and 32 each consist of a lower half-shell-shaped housing segment 7 and an upper half-shell-shaped housing segment 12.

The drive unit 9 has connecting elements in the form of radially surrounding annular grooves 16 and 17, the drive unit 9 having an output housing 18 which is rotatable relative to the motor/gearbox housing 19 of the drive unit 9. The annular groove 16 of the motor/gearbox housing 19 accommodates groove blocks 20 which are provided at corresponding locations on the inside of the lower housing segment 7 of one axis member 31, while at the same time when the drive unit 9 is pressed in, the annular groove 17 of the output housing 18 engages groove blocks 21 of the lower housing segment 7 of the other axis member 32.

The dividing line between the housing segments 7 and 12 is designed as a tongue-and-groove connection 34/35.

The upper housing segments 12 are then placed so that, on the one hand, the ring grooves 16 and 17 in the upper area also engage with the corresponding groove blocks 20 and 21 and, on the other hand, the tongue-groove connection 34/35 is formed between these housing segments 7 and 12. The final fastening of the groove blocks 20 and 21 in the ring grooves 16 and 17 as well as the fastening of the lower housing segment 7 with the upper housing segment 12 is done by means of screws 22.

The structure of the axis links 31 and 32 described here as well as the installation of a drive unit 9 in a joint between these axis links 31 and 32 is, for example, described in the German Patent Application No. 10 2015 012 960.0, which is expressly referred to here. In this way, the axis link 32 is then finally mounted so that it can rotate relative to the axis link 31.

Figure 4B:
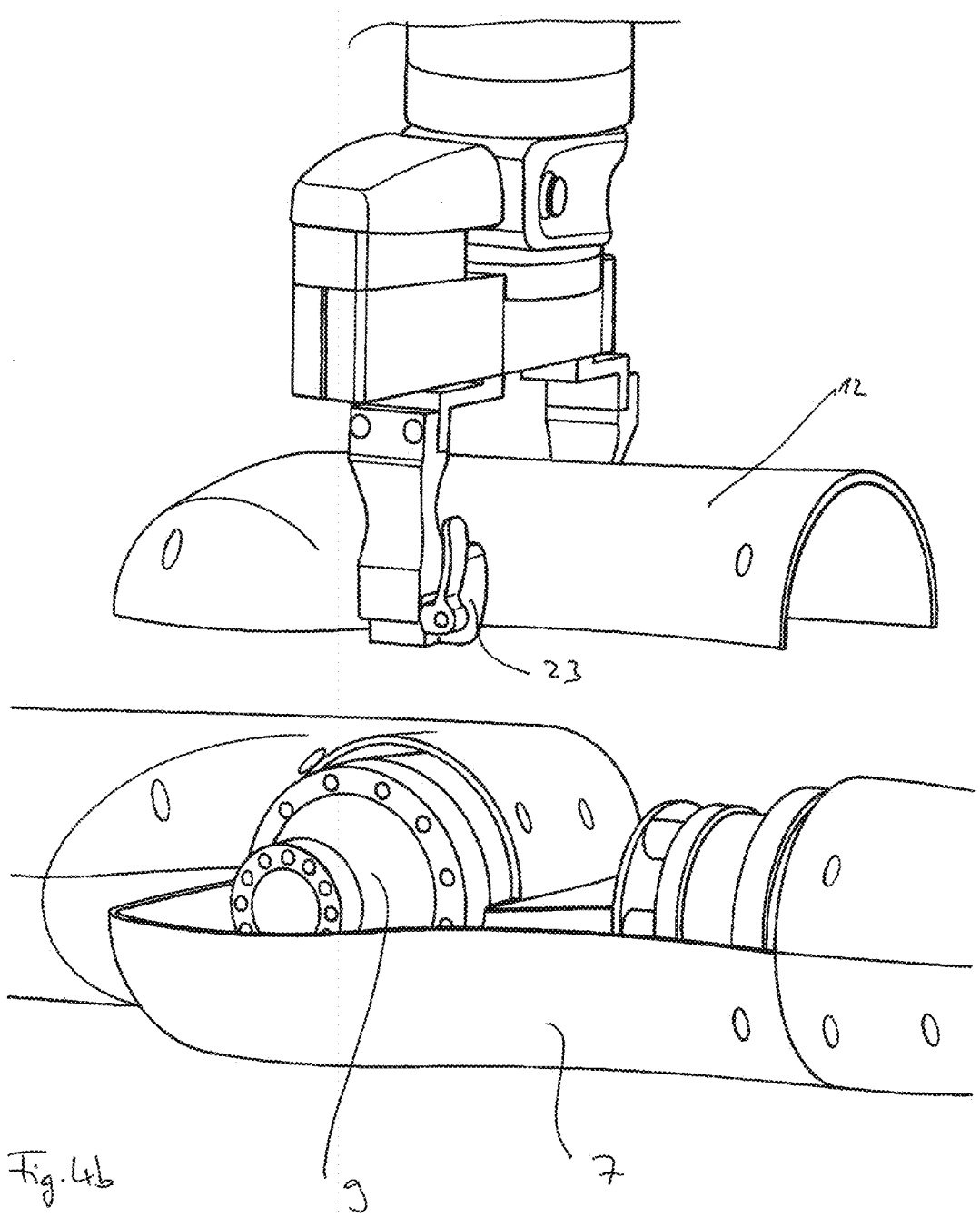
Figure 4C:
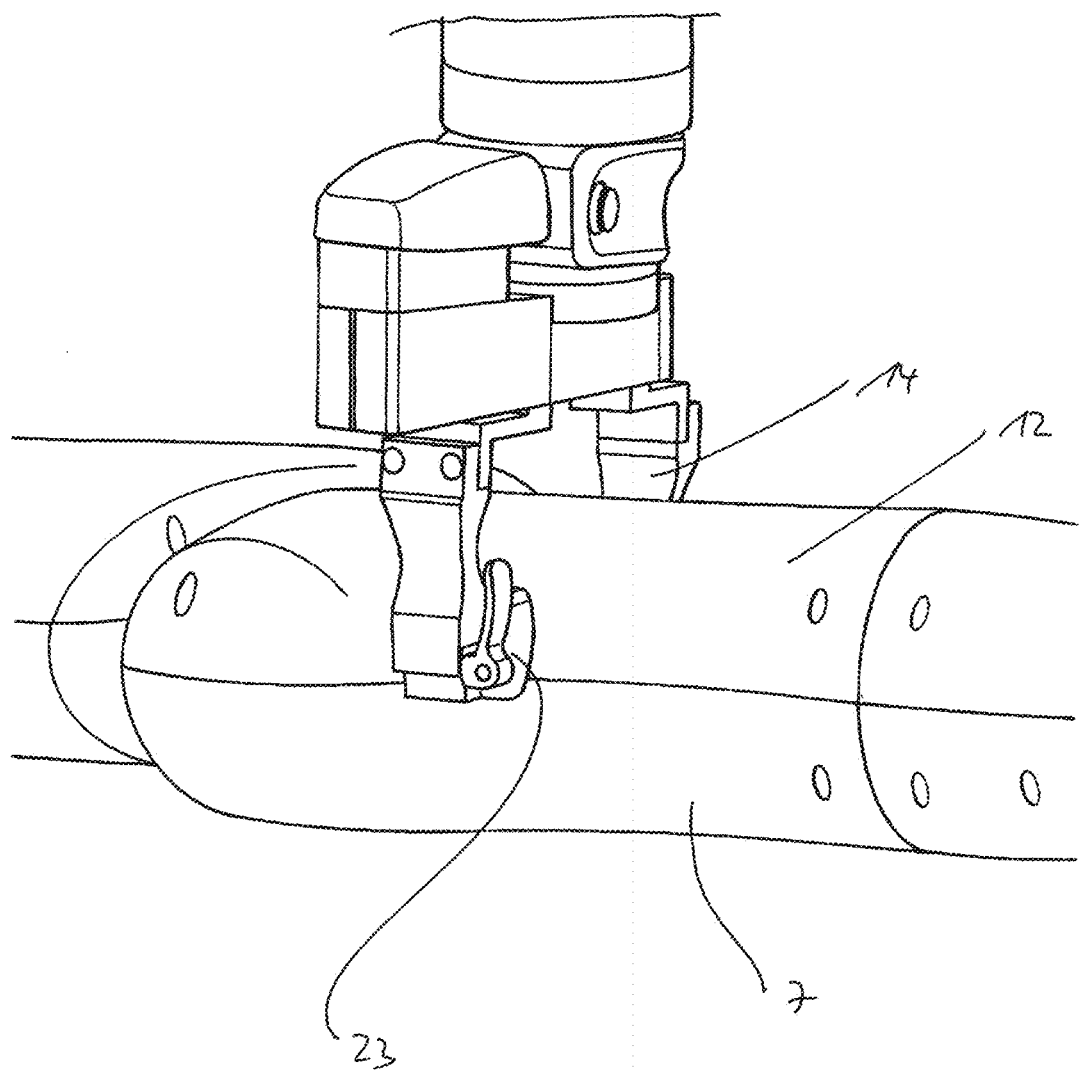

The sequence of FIGS. 4a, 4b and 4c shows a further step in the method according to the invention, in which an assembly robot M1 or M2 picks up the upper housing segment 12 from a tray by engaging the gripping mechanism 5 on the outer contour of the upper housing segment 12. For this purpose, the gripper fingers 14 have correspondingly designed further gripper jaws 23, which are based on the contour of the upper housing segment 12.

The gripper jaws 23 are designed so that they grip the housing segment 12 so that it cannot fall out of the gripper mechanism 5 by itself. A friction-enhancing coating on the inside of the gripper jaws 23, for example, is conceivable for this purpose. The gripper jaws can also have 12 pin-like projections, pins or the like, which engage in the holes 26 already provided in the housing segment for the screw connections (see FIG. 3) and thus center the housing segment 12 correctly in the gripper mechanism 5 at the same time.

Then both housing segments 7 and 12 are screwed together as shown in FIGS. 5a and 5b.

For this purpose, the gripper mechanism 5 has gripper jaws 24, which are designed to receive a conventional electric screwdriver 25, normally designed for manual operation, and then lead sequentially to the corresponding openings 26 in the housing segments 7, 12 and insert the screwdriver element of the screwdriver 25 there. In advance, the screws 22 can be loosely inserted into these openings 26 by one of the assembly robots M1 or M2 or the screws 22 are magnetized and are picked up with the screwdriver element of the screwdriver 25 directly via a guide of the assembly robot M1 or M2 from a corresponding tray.

Due to the fact that the assembly robots M1 and M2 are designed to grip standard tools and guide them to the appropriate places, there is no need for individually designed and therefore expensive tool devices, which would then have to be connected to the effector via additional coupling mechanisms. There is also no need for time-consuming programming for the coupling and guiding of such tool adapters, which must also be equipped with corresponding additional sensor devices for their exact control.

Once all the axis members 3 of manipulator 2 have been fully assembled, effector 4 and base element 6 have been fitted and the wiring for the power supply and control of the drive units 9 has been laid in the appropriate places inside, the robot 3 can be fitted with a power and control connection. As FIGS. 6a and 6b show, it is possible that the gripping mechanism 5 has corresponding gripper jaws 27, which grip a plug 28 and plug into a corresponding socket 29 on the base element 6.

This allows the assembled robot R to be supplied with power. According to the invention, it is conceivable that an on/off switch 30 could then be actuated by one of the assembly robots M1 or M2, as shown in FIGS. 7a and 7b. The gripper mechanism 5 has correspondingly shaped gripper jaws 33 for this purpose.

The assembly robots M1 and M2 are designed in such a way that they are able to change independently between different gripper jaws 15, 23, 24, 27 and 33 depending on the assembly step to be carried out, since these have an identical coupling between the gripper fingers 14 and the gripper jaws 15, 23, 24, 27 and 33, which enables easy changing. Such a universal connection is for example described in detail in the German patent application No. 10 2016 004 087.4, the disclosure content of which is expressly referred to herein.

If the assembled robot R is then supplied with power, a corresponding program control causes it to erect itself independently by controlling the individual drive units 9, as shown in FIGS. 8a and 8b.

The invention claimed is:

1. A method for manufacturing a robot having at least one multi-axis robotic arm which consists of a plurality of axis members which are arranged movably relative to one another via a joint and each form an axis of the robotic arm, the axis members being constructed from at least two complementary housing segments which each have, at at least one of their ends, a bearing device, the method comprising the following steps:

arranging first housing segments of two adjacent axis members in an order provided for the robotic arm, the first housing segments overlapping one another at a joint region between the two adjacent axis members;

inserting drive units into the first housing segments at the joint region between the two adjacent axis members with the drive units being connected to the bearing devices of the first housing segments provided for this purpose thereby linking the first housing segments together;

placing respective complementary second housing segments on the first housing segments comprising the drive units, with the drive units being connected to the bearing devices of the second housing segments provided for this purpose; and fastening the second housing segments to the first housing segments by means of fastening means, whereby the drive units are fixed in the two adjacent axis members;

the method steps being automatically executable by at least one assembly robot, wherein the first housing segments are arranged horizontally with upwardly facing openings providing a receiving surface for the drive units to be inserted in the joint region.

2. The method according to claim 1, further comprising the step performed by the at least one assembly robot:

attaching electrical lines and/or media lines and/or sensor modules to the inserted drive units and/or in the first and second housing segments.

3. The method according to claim 1, further comprising the steps performed by the at least one assembly robot:

attaching a base member to a lower axis member of the robotic arm; and/or attaching an effector receiving member to an upper axis member of the robotic arm.

4. The method according to claim 1, in which the at least one assembly robot automatically removes components of the robot to be produced and/or tools required in each case for individual assembly steps from a stationary and/or mobile storage.

5. The method according to claim 3, in which the at least one assembly robot automatically changes the effector required for individual assembly steps as a function of the individual assembly steps to be carried out.

6. The method according to claim 1, further comprising the steps performed by said at least one assembly robot:

connecting the assembled robot to a power supply and/or data supply and/or media supply.

7. The method according to claim 6, further comprising the step executable by said at least one assembly robot:

activating at least one functional test for the assembled robot.

8. The method according to claim 1, in which the assembly steps are carried out with the robot to be assembled arranged horizontally in a longitudinal direction.

9. The method according to claim 8, further comprising the step performed by said at least one assembly robot:

transferring an assembled robot to a defined position.

10. The method according to claim 8, further comprising the steps:

connecting an assembled robot to a power supply and/or data supply; and controlling the assembled robot so that it automatically moves to a defined position.

11. The method according to claim 1, in which the at least one assembly robot is designed to be compliant and/or sensitive.

12. The method according to claim 1, in which the robot to be assembled is of identical design to the at least one assembly robot.

13. A robot having a multi-axis robotic arm which comprises a plurality of axis members which are arranged movably relative to one another and which each form an axis of the robotic arm, the axis members being constructed from at least two complementary housing segments, the robot being producible according to claim 1.

* * * * *